(12) United States Patent
Berminge

(10) Patent No.: US 7,419,337 B2
(45) Date of Patent: Sep. 2, 2008

(54) PARTING BLADE FOR TURNING PURPOSES

(75) Inventor: Erik Berminge, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/414,529

(22) Filed: May 1, 2006

(65) Prior Publication Data

US 2006/0257217 A1 Nov. 16, 2006

(30) Foreign Application Priority Data

May 2, 2005 (SE) .................................... 0501026

(51) Int. Cl.
B23B 29/00 (2006.01)
(52) U.S. Cl. ..................... 407/101; 407/107; 407/117
(58) Field of Classification Search ................ 407/117, 407/101, 107, 108, 102, 94
See application file for complete search history.

(56) References Cited

U.S. PATENT DOCUMENTS

| | | | |
|---|---|---|---|
| 4,938,641 A | 7/1990 | Maier | |
| 5,031,492 A * | 7/1991 | Zinner | 82/158 |
| 6,099,210 A | 8/2000 | Grainger | |
| 6,186,704 B1 * | 2/2001 | Hale | 407/101 |
| 6,758,637 B2 * | 7/2004 | Gati | 407/92 |

FOREIGN PATENT DOCUMENTS

| | | |
|---|---|---|
| CA | 2 222 249 | 8/1999 |
| RU | 2 065 800 | 8/1996 |

* cited by examiner

*Primary Examiner*—Willmon Fridie, Jr.
(74) *Attorney, Agent, or Firm*—Drinker Biddle & Reath LLP

(57) ABSTRACT

A parting blade having a flat, elongate body, which is delimited by two opposite side surfaces and has two opposite longitudinal edges which are mutually parallel and present chamfered surfaces for wedging the body in a holder, and which includes at least one insert seat formed adjacent to an end, the position of which seat in relation to a longitudinal edge determines the tip height of a turning insert mounted in the insert seat. An attachment part is formed on one of the side surfaces of the blade body. The attachment part is shorter and thinner than the proper blade body and has two opposite longitudinal edges which are mutually parallel and present chamfered surfaces for wedging the attachment part in another holder. In this way, the parting blade can be formed for robust, wide turning inserts and in spite of this be mounted in holders intended for considerably thinner parting blades.

2 Claims, 4 Drawing Sheets

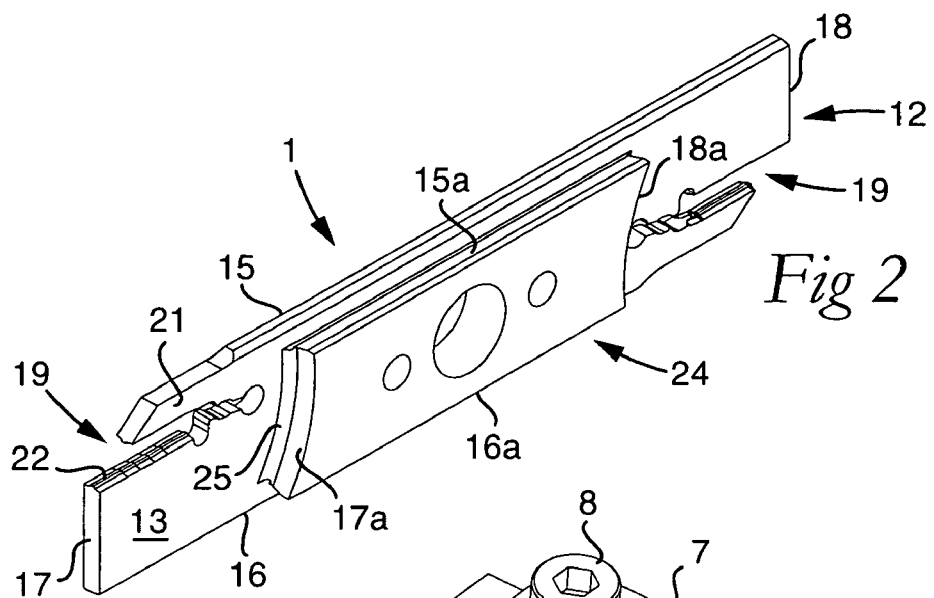
Fig 2
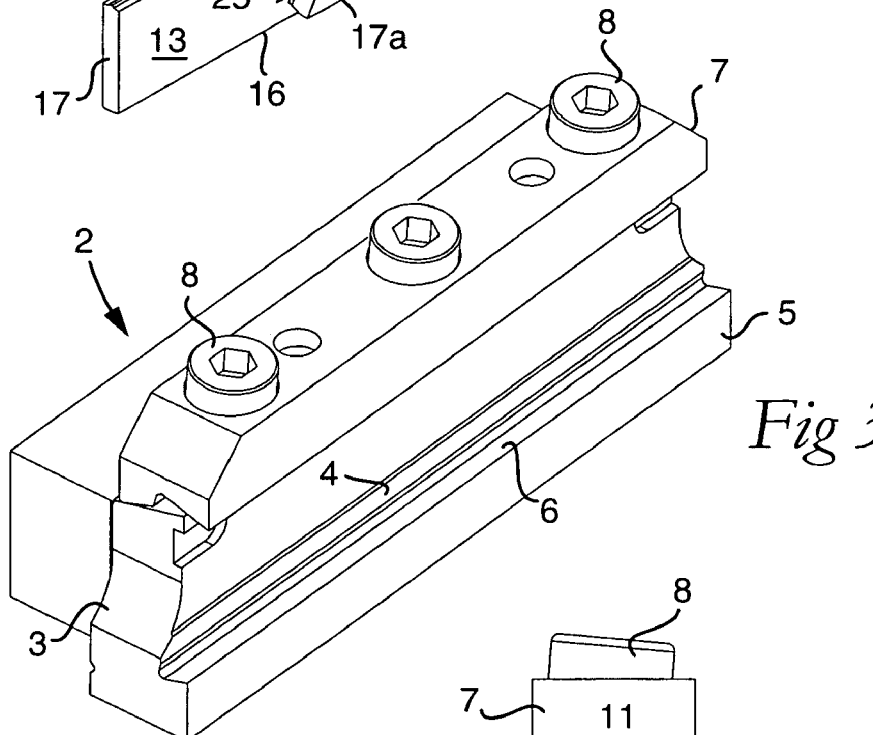
Fig 3
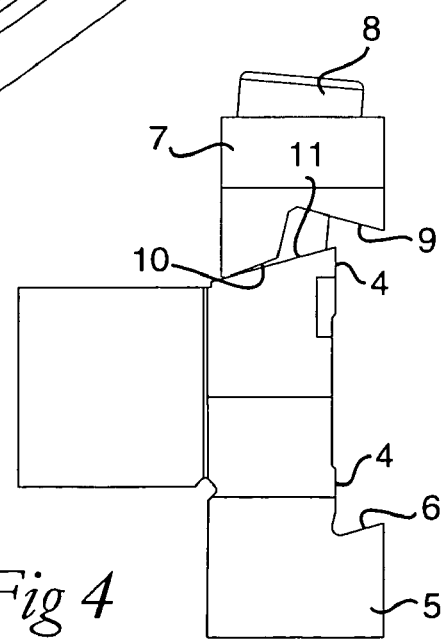
Fig 4
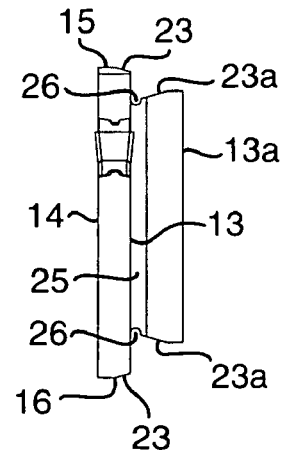

PARTING BLADE FOR TURNING PURPOSES

FIELD OF THE INVENTION

This present invention relates to a parting blade for mounting in a fixed holder of a turning tool. More particularly, the present invention relates to a parting blade of the type that is in the form of a flat, elongate body, which is delimited by opposite side surfaces and has upper and lower longitudinal edges which are mutually parallel and present chamfered surfaces for wedging the body in a holder, as well as opposite ends, and which comprises an insert seat formed adjacent to an end, the position of which seat in relation to the lower longitudinal edge determines the tip height of a turning insert mounted in the insert seat.

BACKGROUND

Parting blades of the type generally mentioned above are mountable in fixed holders in order to, together with a wear part in the form of a replaceable turning insert, form a turning tool having the purpose of carrying out parting or grooving operations in rotating workpieces. Typically, the blade—at least near the insert seat—has to have a thickness that is smaller than the width of the turning insert carried by the blade, because otherwise the blade would not go free in the gap generated in connection with the grooving of the turning insert into the workpiece. The so-called insert-tip height has a great importance to the dimensioning of the tools, which height is a measure of the position or level of the insert seat in relation to the lower longitudinal edge of the blade. It is always desirable that the insert seat is located as high as possible in the overhung end of the blade that protrudes from the tool holder, in order to, in such a way, endow the front, supporting blade portion that is present under the insert seat with the greatest possible stiffness. Namely, if this portion would become too weak, the same runs the risk of being deflected or deformed by the very great forces that are applied to the turning insert during machining.

Tools of different dimensions are provided for different applications. Thus, on the market an assortment of small tools is offered, which have an insert-tip height of 21 mm at the same time as the appurtenant turning inserts have a width that varies within the range of 1.5-3 mm. Another assortment—in the form of medium-sized tools—has an insert-tip height of 25 mm and a set of turning inserts the width of which varies within the range of 1.5-8 mm. Furthermore, tools that are even more robust may also be found. Within the different assortments, different solutions are found to the problem of reliably fixing the turning insert in the insert seat. A usually occurring solution is the so-called spring clamping. In this case, the turning insert is kept clamped only by means of the inherent elasticity or flexibility of a clamping finger present above the bottom of the insert seat. Another solution is screw clamping. In this case, the clamping finger is actuated also by a screw, which upon tightening, clamps the finger by a force that is considerably greater than the plain spring-tension force. In other words, screw clamping is more reliable than spring clamping.

The holder used to clamp the blade and which may be included in a turning lathe or a multioperation machine is a robust block, which includes side support surfaces against which an inside of the blade may be pressed, and which has a lower, fixed jaw against which the lower longitudinal edge of the blade is applied. A movable upper jaw co-operates with a number of screws, which upon tightening press the movable jaw against the upper longitudinal edge of the blade. The two longitudinal edges of the blade are formed with chamfered surfaces, which converge in the direction outward and cooperate with analogous, although inwardly converging chamfer surfaces of the jaws. Therefore, when the jaws approach each other by the tightening of the screws, a wedge action arises, which by a great force presses the inside of the blade firmly against the side support surfaces of the block.

Because different types of blades have insert-tip heights of different sizes, one type of holder is required for each type of blade. In practice, the machine equipment of different workshops may vary most considerably. For instance, certain workshops may just have a single type of holder, while others have holders for small as well as large blades. A problem being common to all users—irrespective of the machine equipment—is, however, that the small blades (insert-tip height of 21 mm) only are suitable for the very smallest turning inserts (insert width of max 3 mm). Namely, if a larger and wider turning insert is attempted to be mounted on the smallest blade, the flexural rigidity of the front, supporting end portion of the blade would become too small to be able to resist the cutting forces acting on the turning insert. The section in the area under the insert seat would simply become too weak, since the amount of material (steel) in this section is limited. Naturally, it is feasible to mount the larger turning insert on a more robust blade (insert-tip height of 25 mm), but in such a case, the users only having access to holders for small blades would need to acquire larger holders and maybe rebuild existing machines.

SUMMARY

The present invention aims at managing the above-mentioned problems. Therefore, a primary object of the invention is to provide a parting blade that, on one hand, is sufficiently rigid to resist the mounting of comparatively robust turning inserts, and on the other hand can be clamped in holders for blades having a small insert-tip height. It is also an object to provide a parting blade that offers the possibility of mounting turning inserts having different insert-tip heights. An additional object is to provide a parting blade that is simple in the construction thereof and therefore inexpensive to manufacture in spite of universal applicability.

According to a first aspect, a parting blade comprises a flat, elongate body, including two opposite side surfaces, two opposite ends and two opposite, longitudinal edges which are mutually parallel and present chamfered surfaces for wedging the body in a holder. An insert seat is formed adjacent to one of the two opposite ends, the position of which seat in relation to a longitudinal edge determines the tip height of a turning insert mounted in the insert seat. The insert seat includes an attachment part projecting from one side of the blade body, which attachment part is shorter and thinner than the body. The insert seat includes two opposite longitudinal edges, which are mutually parallel and present chamfered surfaces for wedging the attachment part in another holder

BRIEF DESCRIPTION OF THE APPENDED DRAWINGS

FIG. 2 is a perspective view of just the parting blade without the appurtenant turning insert.

FIG. 3 is a perspective view of only the large holder according to FIG. 1.

FIG. 4 is an exploded end view of the holder and the parting blade,

DETAILED DESCRIPTION

Figure 1:
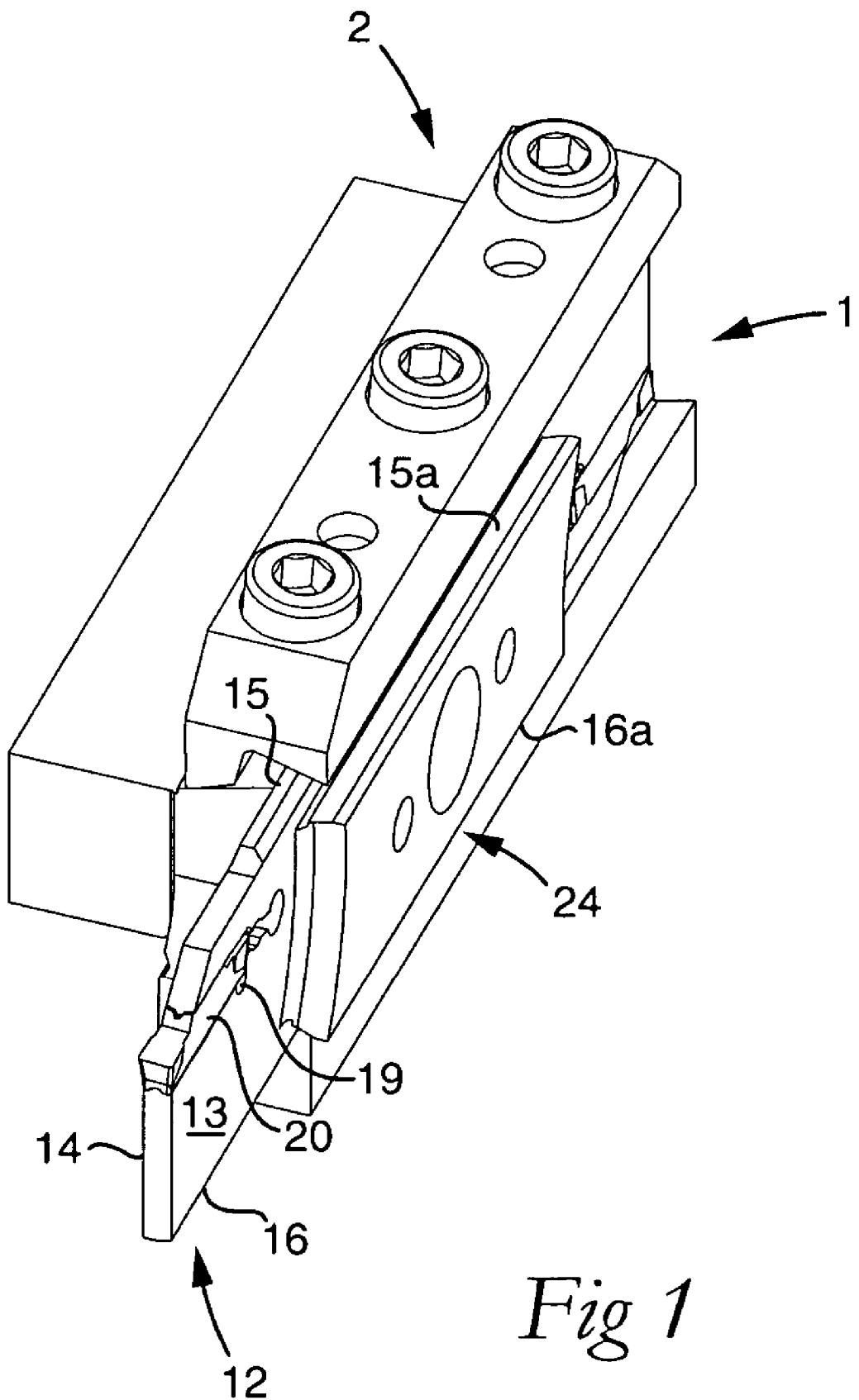
FIG. 1 is a perspective view showing a first type of tool holder (large) in which a parting blade according to the invention equipped with a turning insert is mounted.

First reference is made to FIGS. 1-4, FIG. 2 of which shows a parting blade 1, and FIG. 3 illustrates a holder 2 for clamping the blade. The holder 2 includes a robust block 3 on the front side of which two vertically spaced-apart support surfaces 4 are formed, which are planar and situated in a common vertical plane. At the bottom, the block 3 is formed with a lower, fixed supporting jaw 5, which on the top side thereof has a chamfered support surface 6. On the upper part of the block, a movable or clamping jaw 7 is mounted, which can be tightened by means of a number of screws 8. On the bottom side of the jaw 7, a chamfered surface 9 is formed being analogous to the chamfer surface 6. As is clearly seen in FIG. 4, the jaw 7 also has a second, chamfered surface 10, which is arranged to be pressed against a likewise chamfered top surface 11 of the block 3. Initially, the surfaces 10, 11 form a certain, moderate angle with each other, but when the screws 8 are tightened, the surfaces are pressed towards each other, at the same time as the movable jaw 7 tilts in the direction outward (clockwise in FIG. 4).

The parting blade 1 according to FIG. 2 includes in a conventional way a flat, elongate body 12, which generally has a parallelepipedic basic shape. Thus, the body 12 is delimited by two opposite side surfaces 13, 14 (see also FIG. 4), two opposite, longitudinal edges 15, 16, as well as two opposite ends or end edges 17, 18. The two side surfaces 13, 14 are planar and mutually parallel. Also the longitudinal edges 15, 16 are mutually parallel. The end edges 17, 18 may (but need not) extend perpendicularly to the longitudinal edges of the blade body 12. The blade body is generally thin, so far that the height or width thereof, counted as the distance between the longitudinal edges 15, 16, is many times greater than the thickness thereof. Simultaneously, the length of the blade body is many times greater than the height/width. In this connection, it may be mentioned that the thickness of the blade body may even be somewhat smaller than 1.5 mm, while the height may amount to 30 mm or more.

In the area of at least one of the end portions of the blade body, an insert seat 19 is formed for the receipt of a cutting insert in the form of a turning insert 20 (see FIG. 1). In the embodiment shown, the blade body is formed with two insert seats, which are diametrically opposed each other, i.e., one of them is situated adjacent to the longitudinal edge 15, and the other one adjacent to the longitudinal edge 16. As may be best seen in FIG. 2, the individual insert seat is delimited by an elastic, deflectable clamping finger 21 and a lying bottom surface 22 against which the bottom side of the turning insert may be pressed. In the embodiment shown in FIGS. 1-4, the turning insert 20 is clamped only by the spring force of the clamping finger 21.

Furthermore, it should be pointed out that the blade body 12 along the two longitudinal edges 15, 16 thereof has chamfered surfaces 23, which are placed in such a way that they converge towards the side surface 13. In the example, the mutual angle between the surfaces 23 amounts to approximately 30°. It should be evident that the surfaces are intended to co-operate with the surfaces 6, 9 in the holder 2, and therefore also these surfaces preferably converge with the same angle.

However, the turning tool includes an attachment part, generally designated 24, projecting from one side (in the example the side 13) of the blade body 12, which attachment part is shorter and thinner than the proper blade body 12, and which has two opposite, mutually parallel longitudinal edges 15a, 16a. The fact that the attachment part 24 is "thinner" than the blade body is a consequence of the perpendicular distance between the longitudinal edges 15a, 16a being smaller than the corresponding distance between the longitudinal edges 15, 16. Like the proper blade body 12, the attachment part 24 has the shape of a comparatively thin plate, which, however, is considerably shorter than the blade body. Thus, each one of the ends 17a, 18a of the attachment part is situated at a certain distance inside the respective insert seat 19. It is notable that the surfaces that form the ends 17a, 18a are curved or arched. More precisely, the surfaces have a concave shape in order to, on one hand, accommodate a key (not shown) arranged, when this is turned, for the mounting and dismounting of the turning insert 20, and on the other hand guarantee that the chamfered contact surfaces 15a, 16a get the greatest possible length with the purpose of offering an optimal support in a holder. However, the end surfaces 17a, 18a may also be straight.

As is seen in FIG. 4, also the longitudinal edges 15a, 16a of the attachment part 24 are formed with chamfered surfaces 23a, which converge towards one side 13a of the part, suitably at the same angle (30°) as the chamfer surfaces 6, 9. However, the surfaces 23a converge in the opposite direction toward the corresponding chamfer surfaces 23 of the blade body 12. For the sake of completeness, it should be pointed out that the longitudinal edges 15a, 16a of the attachment part 24 are parallel to the longitudinal edges 15, 16 of the blade body, as well as spaced a distance from the same.

In the embodiment shown, a plate-shaped waist or flat piece 25 is formed between the attachment part 24 and the blade body 12, which waist piece is at least somewhat thinner than the attachment part in the plane defined by two longitudinal recesses 26.

Figure 7:
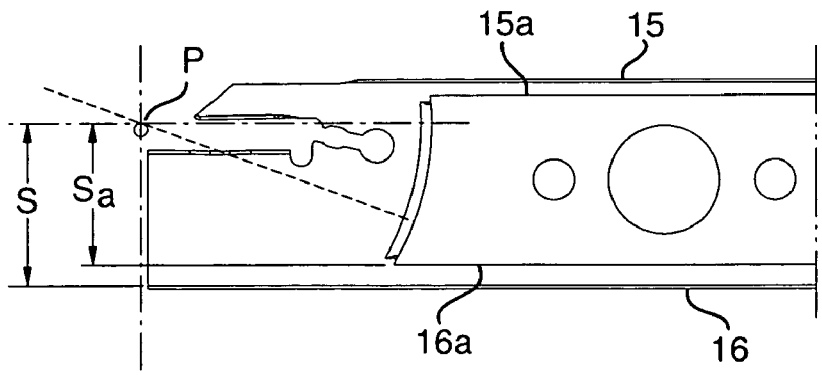
FIG. 7 is a partial side view of the parting blade.

Reference is now made to FIG. 7, in which P designates the point in which the tip of a turning insert (not shown) mounted in the insert seat 19 is located. The letter "S" designates an insert-tip height, such as this is defined as the distance difference or the level difference between the point "P" and the lower longitudinal edge 16 of the blade body 24. "$S_a$" designates another corresponding insert-tip height, such as this is represented by the level difference between the point "P" and the lower longitudinal edge 16a of the attachment part 24.

In FIG. 1, the parting blade in question is shown mounted with the blade body 12 fixed in the holder, which is a large holder. Fixation of the parting blade is carried out by tightening the three screws 8, whereby the movable or the clamping jaw 7 presses the blade not only downward, but also inward, so that the side surface 14 of the blade body is pressed against the support surfaces 4 in the block 3. In this state, the turning insert 20 is located in the desired position, i.e., with the desired insert-tip height, in relation to the fixed holder 2. Simultaneously, the attachment part 24 is inactive by being turned outward and lacking contact with the holder.

Figure 5:
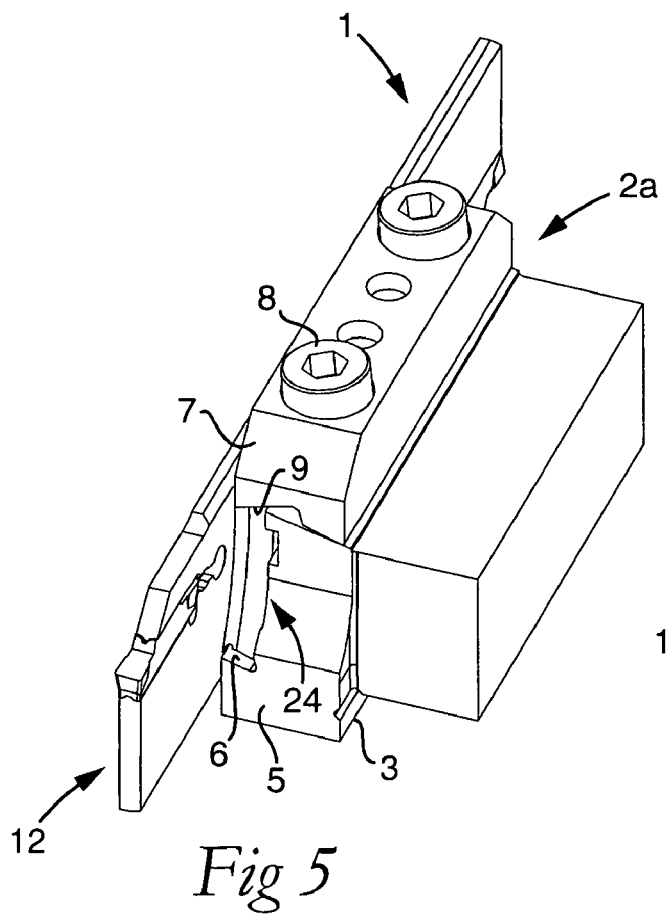
FIG. 5 is a perspective view of another type of holder (small) and in which the same parting blade is mounted.
Figure 6:
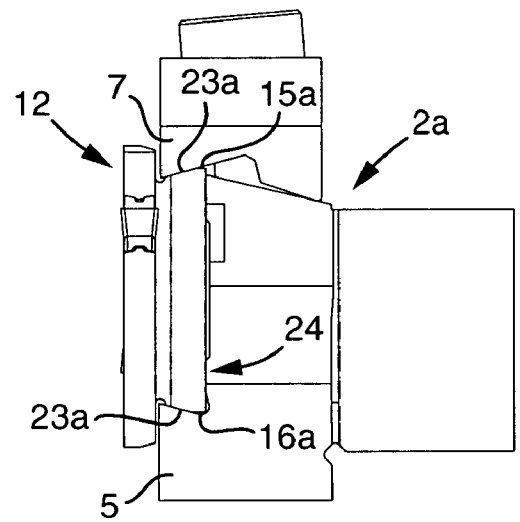
FIG. 6 is an end view showing the parting blade and the holder according to FIG. 5.

Reference is now made to FIGS. 5 and 6, which illustrate another and smaller holder 2a, which has the same constructional design as the holder according to FIG. 1, but which has a gap delimited between the jaws 5, 7 that is smaller or thinner than the corresponding gap in the holder 2. Furthermore, this holder is content with only two screws 8 for the tightening of the clamping jaw 7. Existing holders of this type have previously only been intended for the receipt of small parting blades, for example blades having the insert-tip height of 21 mm. However, because the more rigid parting blade according to the invention includes the described attachment part 24, also this parting blade can be mounted in the smaller holder 2a. Thus, in FIGS. 5 and 6, it is seen that the attachment part 24 can be fixed with the chamfered surfaces 23a of the longitudinal edges 15a, 16a in contact with the corresponding surfaces 6, 9 of the jaws 5, 7. By the fact that the level difference between the lower longitudinal edge 16 of the blade body 12 and the lower longitudinal edge 16a of the attachment part 24 has been selected in view of the difference (4 mm) between the insert-tip height "S" and the insert-tip height "$S_a$", also in this case the turning insert 20 will be located on the correct, desired level in relation to the holder 2a.

In FIG. 6, it is seen that the attachment body 24 is in contact with the jaws 5, 7 only via the chamfer surfaces 23a, without contacting the blade body. Because the attachment part 24 extends along a major part (more than half) of the surface of the blade body 12, a very torsion-resistant joint is obtained between the attachment part being stably fixed in the holder and the blade body carrying the turning insert. In other words, the turning insert is fixed substantially immovable in the desired position thereof in relation to the holder.

Figure 8:
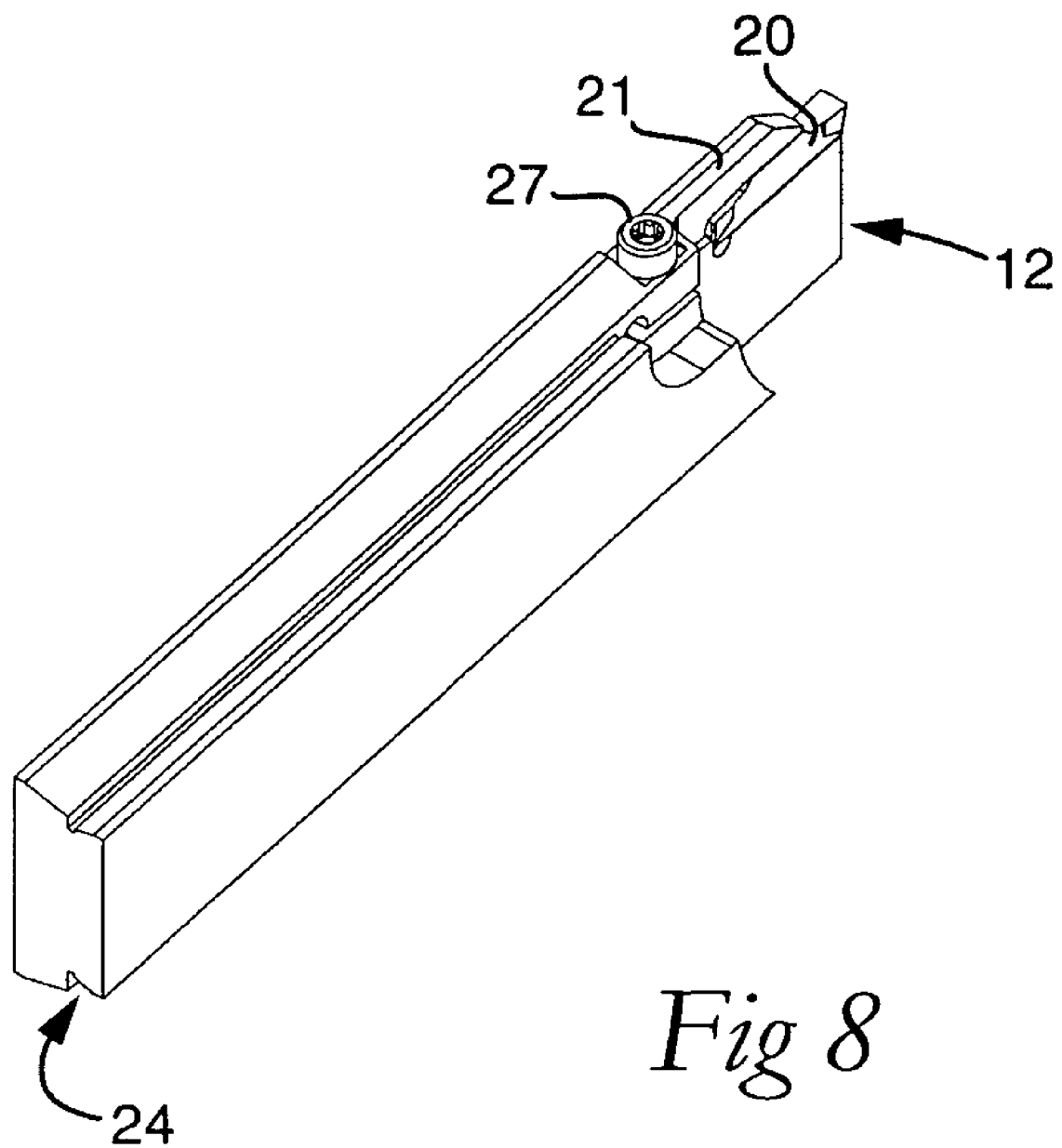
FIG. 8 is a perspective view of an alternative embodiment of the parting blade according to the invention.

In FIG. 8, an alternative embodiment of a parting blade is shown, which differs from the one described above in that, in this case, the turning insert 20 is kept in place by means of a clamping finger 21 that not only is elastically deflectable, but also actuated by a tightening screw 27. By means of the screw, the turning insert can be clamped by a considerably greater tightening force than in the case where the clamping is carried out only by means of the inherent elasticity of the clamping finger. As is clearly seen in FIG. 8, in this case, the blade body 12 is considerably more robust than the corresponding blade body in the embodiment described above. Thus, in practice, the blade body may have a thickness of more than 6 mm, and in such a way accommodate the screw and the threaded hole requisite for the same and that has to be recessed in the interior of the blade body. However, in spite of the increased thickness, also the parting blade—thanks to the presence of the attachment part 24 on one side of the blade body—can be mounted in the type of a small holder illustrated in FIGS. 5 and 6.

A substantial advantage of the parting blade according to the invention is that users/workshops having turning lathes, the tool holders of which cannot or should not be exchanged, can be offered a considerably larger assortment of turning inserts, and in such a way get the possibility of making a far greater number of machining operations (parting, grooving, etc.) than what is the case with the existing machines. Thus, an existing small tool holder may be equipped with a parting blade, the flexural rigidity of which in the critical section under the insert seat is considerably improved and which therefore can carry turning inserts of considerable width in a stable way. Thus, in one and the same holder, not only turning inserts having a width within the range of 1.5-3 mm can be used, but also turning inserts having widths even up to 8 mm.

In conclusion, it should be pointed out that the described parting blade can be manufactured in a simple and economical way, suitably by forming, in a single work piece, e.g., by milling, the main blade body as well as the attachment part on one side of the main blade body. Within the scope of the invention, it is furthermore feasible to arrange an attachment part not only on one side of the main blade body, but also on the opposite side.

Furthermore, it is possible to vary the design of the attachment part, e.g., in such a way that the same is formed with a countersink in the individual longitudinal edge, the countersink axially separating two shorter, chamfered surfaces that are pressed against the co-operating support surface in the holder. It is even feasible to arrange, on one and the same side of the main blade body, two (or more) axially spaced-apart attachment parts instead of a single continuous attachment part.

The presently disclosed embodiments are considered in all respects to be illustrative and not restrictive. The scope is indicated by the appended claims, rather than the foregoing description, and all changes that come within the meaning and range of equivalents thereof are intended to be embraced.

The invention claimed is:

1. A parting blade, comprising:
 a flat, elongate body, including two opposite side surfaces, two opposite ends and two opposite, longitudinal edges which are mutually parallel and present chamfered surfaces for wedging the body in a holder;
 an insert seat formed adjacent to one of the two opposite ends, the position of which seat in relation to a longitudinal edge determines the tip height of a turning insert mounted in the insert seat, the parting blade including an attachment part projecting from one side of the blade body, which attachment part is shorter and thinner than the body, said attachment part including two opposite longitudinal edges, which are mutually parallel and present chamfered surfaces for wedging the attachment part in another holder; wherein a flat waist piece is formed between the attachment part and the blade body, which waist piece is thinner than the attachment part.

2. A parting blade, comprising:
 a flat, elongate body, including two opposite side surfaces; two opposite ends and two opposite, longitudinal edges which are mutually parallel for wedging the body in a holder;
 an insert seat formed adjacent to one of the two opposite ends, the position of which seat in relation to a longitudinal edge determines the tip height of a turning insert mounted in the insert seat, the parting blade including an attachment part projecting from one side of the blade body, which attachment part is shorter and thinner than the body, said attachment part including two opposite longitudinal edges, which are mutually parallel for wedging the attachment part in another holder; wherein a flat waist piece is formed between the attachment part and the blade body, which waist piece is thinner than the attachment part.

* * * * *